United States Patent
Rabideau

(10) Patent No.: US 6,624,783 B1
(45) Date of Patent: Sep. 23, 2003

(54) DIGITAL ARRAY STRETCH PROCESSOR EMPLOYING TWO DELAYS

(75) Inventor: Daniel Rabideau, Acton, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/796,049

(22) Filed: Feb. 28, 2001

(51) Int. Cl.$^7$ ............................. G01S 13/00; H01Q 3/00
(52) U.S. Cl. ........................ 342/195; 342/128; 342/130; 342/131; 342/132; 342/368; 342/377
(58) Field of Search .............................. 342/74–81, 89, 342/98–103, 122, 128–133, 147, 158, 175, 195, 196, 197, 200, 201, 368–377, 118–121

(56) References Cited

U.S. PATENT DOCUMENTS

| | | |
|---|---|---|
| 3,283,080 A | 11/1966 | Caputi |
| 3,354,456 A | 11/1967 | Caputi |
| 4,749,995 A * | 6/1988 | Hopwood et al. .......... 342/371 |
| 5,351,053 A * | 9/1994 | Wicks et al. ................ 342/158 |

OTHER PUBLICATIONS

J.B Hoffman, B.L. Galebach, "Array Wide Instantaneous Bandwidth Capability From Using a Distributed Architecture Approach," 1996 IEEE Int. Symposium on Phased Array Systems and Technology, pp. 135–140.

C. Tarran, M. Mitchel, R. Howard, "Wideband Phased Array Radar with Digital Adaptive Beamforming," 1999 IEE Colloquium on High Resolution Radar and Sonar, May 1999.

* cited by examiner

Primary Examiner—Bernarr E. Gregory
(74) Attorney, Agent, or Firm—Samuels, Gauthier & Stevens, LLP

(57) ABSTRACT

A pulse-type beamforming apparatus, such as a radar array system, is used for receiving, detecting, localizing, and/or imaging desired signals. The apparatus is used to receive wideband chirp signals. The apparatus contains a receive aperture that is partitioned into multiple channels. The received signal at each channel is mixed with a replica chirp. The replica chirp is effectively delayed in a way that partially removes range-dependent distortion of desired signals. The mixer outputs are then sampled and filtered. The filters on each channel incorporate a time delay that completely removes the remaining range-dependent distortion for all signals in a desired direction. Signals are also compressed and integrated by a digital beamformer.

20 Claims, 3 Drawing Sheets

Possible Implementation of Time-Delay and Narrowband Compression Filters for Channel i 300

DIGITAL ARRAY STRETCH PROCESSOR EMPLOYING TWO DELAYS

This invention was made with government support under Contract No. F19628-00-C-0002 awarded by the Air Force. The government has certain rights in the invention.

BACKGROUND OF THE INVENTION

The invention relates to a pulse-type sensor array beamforming apparatus for detection, localization, and/or imaging. It is particularly directed to pulse-type radar arrays employing radio-frequency (RF) transmissions, but may be applied to apparatus employing other types of transmissions.

Many radar applications require high resolution in range and angle, as well as flexible beam formation. Ballistic missile defense (BMD) constitutes one such application. In BMD, high resolution in range and angle are needed to separate, track, identify and classify objects. Flexible beam formation is needed to improve radar resource utilization, reduce revisit times, enhance angle estimation, and to improve robustness to interference.

In practice, there are several standard approaches to obtaining high resolution and flexible beam formation. High range resolution, for example, is obtained by transmitting a wide bandwidth waveform. On receive, the reflected energy is typically down-converted, sampled by an analog to digital converter (ADC), and pulse compressed.

Pulse compression is typically implemented in one of two ways. In the more traditional implementation, pulse compression is performed via digital matched filtering. When high range resolution is required, however, digital matched filtering can be difficult to implement. First of all, digital matched filtering requires that the ADC sample at a rate proportional to the transmitted signal's bandwidth. High ADC sampling rates, however, can be difficult to achieve while simultaneously meeting high dynamic range requirements. Secondly, the matched filtering must be performed in real-time. Consequently, very high sampling rates may result in more data than can be processed in real-time by a designated processing device.

An alternative pulse compression implementation is called "stretch processing." Stretch processing avoids the need for high rate digital sampling and processing. In stretch processing, the radar transmits a wideband linear frequency modulated (LFM) chirp waveform. On receive, the reflected energy is mixed with another LFM chirp, often called a "replica". The mixer output is then processed by an analog filter. Finally, the analog filter's output is sampled and processed by a bank of narrowband digital compression filters (to resolve range). Note that the timing of the replica is usually set so that target signals at the output of the analog filter will be near baseband. The timing offsets between the replica chirp and target echoes will determine the frequencies at the output of the filter. As a result, the ADC sampling rate and subsequent digital processing rate do not need to be proportional to the transmitted signal bandwidth. Lower sampling rates simply limit the unambiguous range offset between the target echo and the replica.

High angular resolution, in contrast, is typically achieved by using a large antenna aperture. To enable high-speed beam scanning and flexible scan patterns, a phased array antenna is typically chosen. A phased array antenna is actually comprised of many individual antenna elements that are distributed spatially. Signals from the various antenna elements are combined to form beams.

The combining of antenna elements can be done using analog or digital methods. Of these, the digital approach (termed "digital beamforming") provides much greater flexibility. Digital beamforming necessitates that each antenna element (or subset of antenna elements—known as a "subarray") is sampled. The digital outputs are then combined as desired, e.g., to steer the array's gain toward a direction of interest.

To meet BMD requirements, the simultaneous utilization of stretch processing, a large phased array, and digital beamforming is desirable. However stretch-based pulse compression was originally formulated only for use with single-channel receivers. Currently, several methods exist for extending stretch processing to work with multi-channel phased array systems.

In one method, each RF antenna channel output is connected to a time delay unit (TDU). The delay value implemented by each TDU is chosen to steer the array toward a direction of interest. This process, known as time-delay beam steering, is well documented in the literature. The TDU's effectively eliminate dispersion of signals coming from a chosen direction of interest, thus improving system performance in this direction. The outputs of the TDU's are combined using an analog beamforming network. The output of this beamformer is connected to the input of a conventional (single channel) stretch processing receiver.

In a variation on this method, each TDU is directly connected to its own stretch processing receiver. The receiver outputs, which are digital, are then combined using a digital beamformer.

Each of these methods, and other similar variations, requires the utilization of multiple analog TDU's. Typically, these units are costly. Size and weight may also be issues. Furthermore, the accuracy of these devices can be difficult to control and may ultimately limit performance. A method that does not rely on analog TDU's is often desired.

In one such method, each RF antenna channel output is connected to a mixer. This device mixes the received energy with a replica chirp. The mixer output is then processed by an analog filter. Next, the analog filter output is sampled. Finally, the sampled signals are either (1) processed by a bank of narrowband digital compression filters (to resolve range), then digitally beamformed, or (2) digitally beamformed, then processed by a bank of narrowband digital compression filters (to resolve range).

In this method, as in conventional single channel stretch, the timing of the replica chirp is usually set so that the analog filter's output (due to a hypothesized target position of interest) will be near baseband. However, since each channel processes signals at a different spatial location, it has been observed that the replica chirps on different channels should be time-delayed relative to one another, in a manner akin to time-delay beam steering.

This method, while partially eliminating the need for an analog TDU, can be shown to degrade as the time difference between the true signal's position and the hypothesized target position (which is used to set the timing of the replica chirp) grows.

SUMMARY OF THE INVENTION

The invention is directed to further improvements in pulse-type sensor arrays for detection, localization, and/or imaging. For convenience, the invention will be described specifically in connection with radar arrays employing radio-frequency transmissions. The application to apparatus employing other types of transmissions will be understood by those skilled in the art.

In accordance with the invention, wideband chirp pulses are transmitted by the radar and reflected from objects to be detected, localized, and/or imaged. The reflected wideband echoes are received through each antenna of the antenna array. Subarray beamforming may then be performed, as desired. Each antenna channel (element or subarray, as applicable) output is then mixed with a delayed replica chirp, producing a signal in which the frequency slope is substantially reduced. Each resultant signal is filtered and sampled. The sampled signal is further digitally filtered to completely eliminate distortion (across the array) due to imprecise knowledge of object range. At this point, either (1) each signal is applied to a digital compression filter whose characteristic matches the reduced frequency slope, followed by digital beamforming, or (2) digital beamforming is performed, with each beamformed output applied to a digital compression filter whose characteristic matches the reduced frequency slope. With proper selection of parameters, the antenna gain, range and range resolution of known wideband-type radars can be obtained, while allowing the use of narrower band ADCs and digital compression filters, and without requiring precise knowledge of the object range. A radar display of the pulse-compressed, beamformed signals is provided.

More specifically, a method is provided for receiving, detecting, localizing and/or imaging signals. At each antenna channel, the propagation delay (relative to a common reference point) for signals from a selected direction is computed. The wideband echoes received through each antenna channel are mixed with a replica chirp. The replica chirp used by each channel's receiver is effectively a delayed version of a common reference chirp. The delay offset value used by a given channel's receiver is chosen to match the propagation delay experienced by a hypothesized signal traveling from the selected direction to that channel. This delay may be implemented in a variety of ways.

Next, an analog filter at the output of each mixer is used to reject all terms but the desired signal (a chirp who's frequency sloped is substantially reduced) and to reduce the sampling rate of the subsequent sampling device.

Each filtered signal is then sampled. After sampling, each resultant digital signal is digitally filtered. The digital filters are chosen to effectively implement time delays. The delay used at a given channel is chosen to match the propagation delay for signals from the selected direction. This choice will completely eliminate distortion due to imprecise knowledge of true range (as long as the signal arrives from the selected direction). The delay filter may be implemented in a variety of ways. Notably, the delay filter may (optionally) be combined with other digital filtering operations (including the desired narrowband digital compression filter needed to resolve range).

After digitally filtering, the signal at each channel is combined with the signals from other channels via digital beamforming. The beams produced by this digital beamformer are then filtered using a narrowband digital compression filter to resolve range (if such filtering has not already been performed within each channel's receiver).

DETAILED DESCRIPTION OF THE INVENTION

In an exemplary embodiment, a radar is used to transmit the signal $s(\lambda)$. This signal is an LFM chirp, $$s(\lambda) \equiv \cos\left(2\pi\left(f_0\lambda + \frac{k\lambda^2}{2}\right)\right) \cdot rect\left(\frac{\lambda}{T}\right) \quad (1)$$

$$rect(x) = \begin{cases} 1 & -\frac{1}{2} \leq x \leq \frac{1}{2} \\ 0 & \text{otherwise} \end{cases} \quad (2)$$

where $\lambda$ represents time, T denotes the pulse duration, $f_0$ is the pulse center frequency, and k determines the frequency modulation slope.

Figure 1:
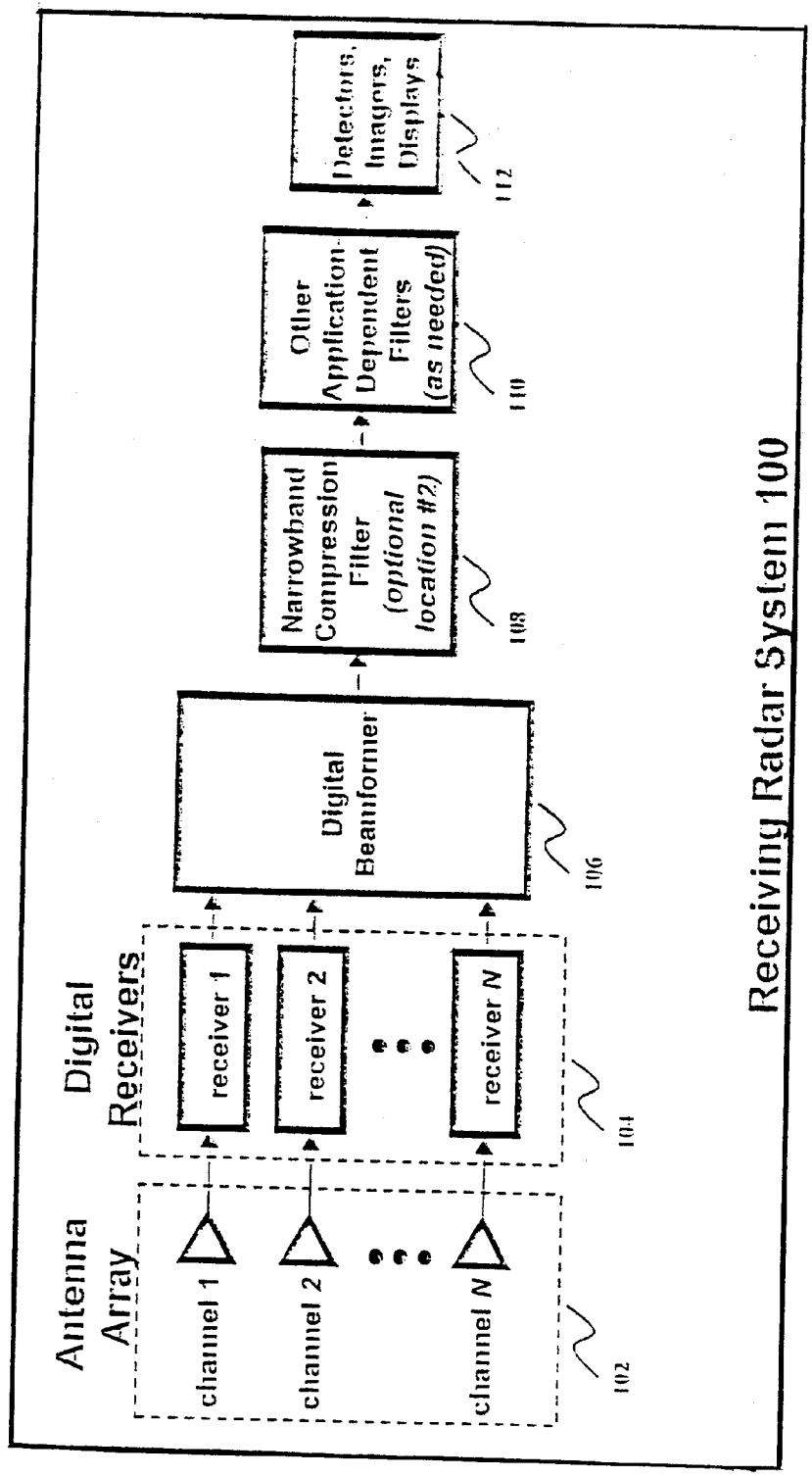
FIG. 1 is a block diagram of a pulse-type detection apparatus in accordance with the invention.
Figure 1:
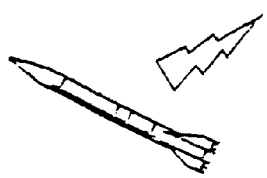

Referring now to FIG. 1, there is shown a receiving radar system 100 that will detect, localize, and/or image received signals. The primary components of the receiving radar system 100 are the antenna array 102, digital receivers 104, digital beamformer 106, narrowband compression filter 108, other application-dependent filters 110, and detectors, imagers, and/or other display devices 112. The antenna array 100 consists of N channels. Each channel might be derived from a single antenna element of a large array, or from a subarray of antenna elements. In the exemplary embodiment described hereinafter, it is assumed that the digital beamformer 106 is used to steer a beam with the full array gain (at all ranges) toward a chosen direction of interest. Those skilled in the art will readily recognize how this digital beamforming device might be used to fully steer the array's capability (that is, without introducing range-dependent spatial distortions in a desired direction) to suit other purposes.

For purposes of illustration, assume a stationary target is present. Thus, the $i^{th}$ array channel will receive a delayed version of the transmitted signal, $s(\lambda-\alpha_i)$, embedded in noise (the signal attenuation and target motion are ignored herein; modifications to include such effects will be obvious to those skilled in the art). The time delay, $\alpha_i$, results from the propagation time needed for the signal to leave the transmit antenna, travel to the target, and then to the $i^{th}$ radar receiving channel. It is straightforward to see that $$s(\lambda - \alpha_i) = \cos\left(2\pi\left[(f_0 - k\alpha_i)\lambda + \frac{k\lambda^2}{2} + \left(\frac{k\alpha_i^2}{2} - f_0\alpha_i\right)\right]\right) \cdot rect\left(\frac{\lambda - \alpha_i}{T}\right). \quad (3)$$

In radar, the aggregate time delay, $\alpha_i$, is considered to be the sum of two terms, $$\alpha_i \equiv \Delta + \beta_i. \quad (4)$$

The first term, $\Delta$, is common to all N array channels. It represents the propagation time needed for the signal to leave the transmit antenna, travel to the target, and then to a common reference point (often chosen to coincide with an element of the array). Note that $\Delta$ depends on the target's range, which is typically unknown. The second term, $\beta_i$, represents the time needed for desired target reflections to travel from the common reference point to the $i^{th}$ array channel. Note that $\beta_i$ does not depend on target range, only the target direction, and the locations of the common reference point and the $i^{th}$ channel. Hence, $\beta_i$ can be precomputed for targets in a selected direction.

Figure 2:
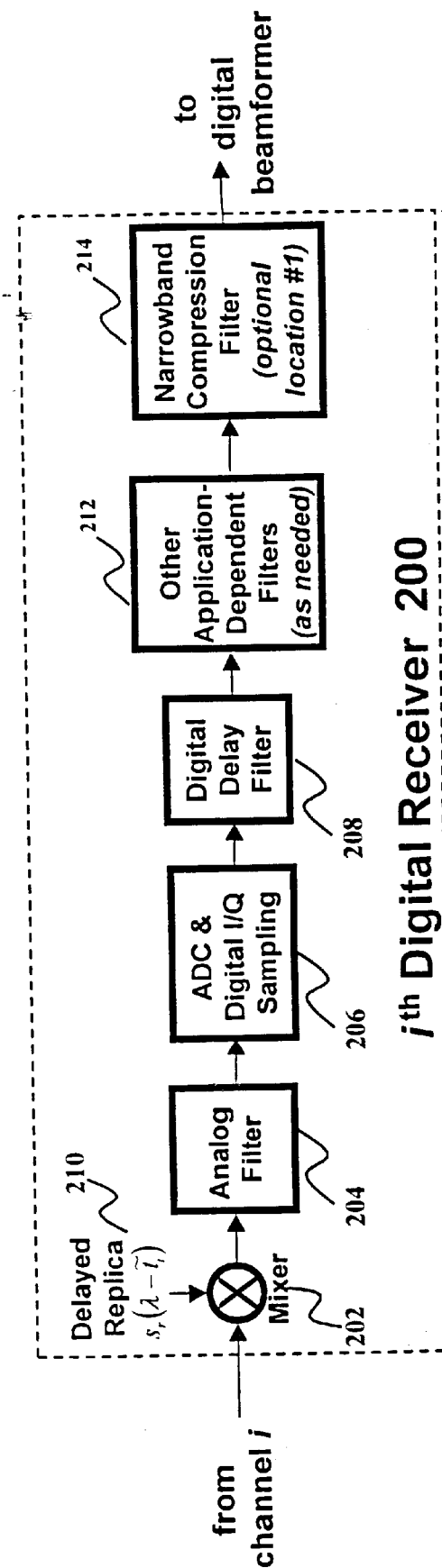
FIG. 2 is a block diagram showing the details of an exemplary receiver.

Referring now to FIG. 2, the received signal is processed by the $i^{th}$ digital receiver 200. There, it enters a mixer 202. In the mixer 202, the received signal is mixed with another chirp 210 (which is often called a "replica chirp"). For illustration purposes, it will be assumed that this other chirp waveform is:

$$s_r(\lambda - \tilde{t}_i) \equiv \cos\left(2\pi\left[(f_0 - k\tilde{t}_i)\lambda + \frac{k\lambda^2}{2} + \left(\frac{k\tilde{t}_i^2}{2} - f_0\tilde{t}_i\right)\right]\right) \cdot rect\left(\frac{\lambda - \tilde{t}_i}{T_r}\right) \quad (5)$$

though it is noted that other chirp waveforms may be used (much as they might be used in a conventional single-channel stretch processor) with minor modification in a way that will be straightforward to someone skilled in the art.

The mixer produces the product of these two signals:

$$s(\lambda - \alpha_i)s_r(\lambda - \tilde{t}_i) = \cos\left(2\pi\left(f_0(\lambda - \alpha_i) + \frac{k(\lambda - \alpha_i)^2}{2}\right)\right) \quad (6)$$

$$\cos\left(2\pi\left(f_0(\lambda - \tilde{t}_i) + \frac{k(\lambda - \tilde{t}_i)^2}{2}\right)\right) \cdot rect\left(\frac{\lambda - \alpha_i}{T}\right)rect\left(\frac{\lambda - \tilde{t}_i}{T_r}\right).$$

Noting that $$\cos A \cos B = \frac{1}{2}\cos(A - B) + \frac{1}{2}\cos(A + B), \quad (7)$$

it is seen that (6) can be written as the sum of two terms:

$$\left[\frac{1}{2}\cos(2\pi[k(\tilde{t}_i - \alpha_i)]\lambda + \phi(\tilde{t}_i, \alpha_i)) + \quad (8)\right.$$

$$\left.\frac{1}{2}\cos(2\pi[2f_0 - k(\tilde{t}_i - \alpha_i)]\lambda + 2\pi k\lambda^2 + \psi(\tilde{t}_i, \alpha_i))\right] \cdot$$

$$rect\left(\frac{\lambda - \alpha_i}{T}\right)rect\left(\frac{\lambda - \tilde{t}_i}{T_r}\right)$$

where the phase shifts are:

$$\phi(\tilde{t}_i, \alpha_i) = 2\pi\left(f_0(\tilde{t}_i - \alpha_i) + \frac{k}{2}(\alpha_i^2 - \tilde{t}_i^2)\right) \quad (9)$$

and $$\psi(\tilde{t}_i, \alpha_i) = 2\pi\left(f_0(-\tilde{t}_i - \alpha_i) + \frac{k}{2}(\tilde{t}_i^2 + \alpha_i^2)\right). \quad (10)$$

Note that the first term in (8) is a cosinusoid whose frequency depends on the timing offset between the received signal and the replica chirp. The second term is a chirp centered at a very high frequency. This second term is removed via analog filter 204, leaving only the cosinusoidal term associated with the range region of interest, i.e., $$s(\lambda - \alpha_i)s_r(\lambda - \tilde{t}_i) \xrightarrow{filter} \quad (11)$$

$$\frac{1}{2}\cos(2\pi[k(\tilde{t}_i - \alpha_i)]\lambda + \phi(\tilde{t}_i, \alpha_i))rect\left(\frac{\lambda - \alpha_i}{T}\right)rect\left(\frac{\lambda - \tilde{t}_i}{T_r}\right)$$

Next, the output of analog filter 204 is I/Q sampled 206, yielding $$\frac{1}{2}e^{j2\pi k(\tilde{t}_i - \alpha_i)\lambda}e^{j\phi(\tilde{t}_i, \alpha_i)}rect\left(\frac{\lambda - \alpha_i}{T}\right)rect\left(\frac{\lambda - \tilde{t}_i}{T_r}\right) \quad (12)$$

(note that the required sampling rate is substantially reduced, in a manner akin to conventional single-channel stretch processing). From (12), observe that the signal at the output of the mixer is a phase-shifted complex sinusoid. The frequency of this sinusoid can, in general, vary from channel to channel. When digital beamforming 106 is performed, such frequency shifts might cause a smearing of the target response in range.

Likewise, the phase term in (12) can, in general, vary from channel to channel. When digital beamforming 106 is performed, this phase variation might cause a loss in aperture gain.

To eliminate these channel to channel frequency and phase variations, the receiver 200 incorporates two delays. The first delay, as has already been indicated, is applied in the chirp 210. The second delay, 208, is applied to the mixer output signal. There are several techniques that might be used for implementing this pair of delays. For example, the second delay can be implemented via finite impulse response (FIR) filtering. In this case, other application dependent FIR filters (such as channel equalizers) 212, or even the narrowband digital compression filter 214, can be mathematically combined with the time-delay filter 208. Mathematically combining cascades of FIR filters into a single filter is a well-known technique in the field of signal processing, and can lead to reduced computational processing.

After time-delay filtering 208 and application-dependent filtering 212, the digital signals are either (1) processed by a bank of narrowband digital compression filters 214 (to resolve range) as needed, then digitally beamformed 106, or (2) digitally beamformed 106, then processed by a bank of narrowband digital filters 108 (to resolve range) as needed.

The key to the invention is the selection of the two effective time-delays employed by each receiver. First, there will be provided a mathematical description of how these delays are used to prevent degradation of desired signals. Later, possible implementations of these delays will be presented.

Consider the first delay, $\tilde{t}_i$, that is incorporated into the chirp 210. One can consider this delay to be the sum of two terms, $$\tilde{t}_i = \Gamma + \beta_i. \quad (13)$$

The first term, $\Gamma$, is common to all N receivers. In radar applications, $\Gamma$ is chosen to coincide with a target range region of interest. The second term, $\beta_i$, was originally introduced in equation (4).

Consequently, the signal in (12) can be written as:

$$\frac{1}{2}e^{j2\pi k(\Gamma - \Delta)\lambda}e^{j\phi(\Gamma + \beta_i, \Delta + \beta_i)}rect\left(\frac{\lambda - \Delta - \beta_i}{T}\right)rect\left(\frac{\lambda - \Gamma - \beta_i}{T_r}\right). \quad (14)$$

Note that choosing $\tilde{t}_i$ as in (13) ensures that the signal frequency in (14) is the same across channels for targets in the desired direction. Furthermore, the phase shift in (14) is:

$$\phi(\Gamma + \beta_i, \Delta + \beta_i) = 2\pi\left(f_0(\Gamma - \Delta) + \frac{k}{2}(\Delta^2 - \Gamma^2)\right) + 2\pi k(\Delta - \Gamma)\beta_i. \quad (15)$$

Note that only the second phase term in (15) can vary from channel to channel.

Thus, the first delay applied in chirp 210 will eliminate range smearing (due to frequency variations) and restore most of the aperture loss due to phase variations across the array. There is, however, a small phase variation in (15) that remains. This phase variation is proportional to the difference between $\Delta$ and $\Gamma$. This means the phase variation will be zero, resulting in perfect aperture gain, whenever the true target range coincides with the chirp 210. As the target echo time advances (or delays) from chirp 210, the absolute phase shift increases, resulting in a loss in SNR at the output of the subsequent beamformer.

In the invention, a second time delay 208 is used to completely eliminate the potential phase variation that remained in (15). Consider the signal of equation (14). In the exemplary embodiment, this signal is delayed by $-\beta_i$. Thus, taking (14) and replacing $\lambda$ by $\lambda + \beta_i$:

$$\frac{1}{2} e^{j2\pi k(\Gamma - \Delta)\lambda} e^{j2\pi k(\Gamma - \Delta)\beta_i} e^{j\phi(\Gamma + \beta_i, \Delta + \beta_i)} rect\left(\frac{\lambda - \Delta}{T}\right) rect\left(\frac{\lambda - \Gamma}{T_r}\right). \quad (16)$$

From (16) and (15), the aggregate phase shift is:

$$\phi(\Gamma + \beta_i, \Delta + \beta_i) + 2\pi k(\Gamma - \Delta)\beta_i = 2\pi\left(f_0(\Gamma - \Delta) + \frac{k}{2}(\Delta^2 - \Gamma^2)\right). \quad (17)$$

Note that the right hand side of (17) contains no dependence on the channel index, i. Hence, the phase variation across channels will be zero at the output of the second delay 208 (for targets in the desired direction).

In summary, it is seen that two delays are needed: the first, of size $\tilde{t}_i \equiv \Gamma + \beta_i$, is applied to chirp 210; the second, of size $-\beta_i$, is applied via filter 208 after mixing.

There are a number of ways that these delays may be implemented; the preferred method will depend on the details of the receiver hardware. A survey of a few possible approaches for implementing each of these delays is provided hereinafter.

Consider the first delay. In one possible implementation, each digital receiver would have its own waveform generator operating at RF. In this case, each waveform generator might be controlled to directly produce waveform 210 with the desired delay, i.e., the waveform of equation (5).

In another possible implementation, each digital receiver would have its own waveform generator operating at an intermediate frequency (IF) $f_1$, who's output is subsequently upconverted to RF via mixing with a common local oscillator (LO) at frequency $f_2$ chosen such that $f_0 = f_1 + f_2$. Let $p_i(\lambda)$ denote the IF waveform generated for channel i, defined as $$p_i(\lambda) = \cos\left(2\pi\left[f_1(\lambda - \tilde{t}_i) + \frac{(k(\lambda + \tilde{t}_i))^2}{2} + \chi_i\right]\right) rect\left(\frac{\lambda - \tilde{t}_i}{T_r}\right)$$

(where $\tilde{t}_i$ and $X_i$ are a channel-dependent time delay and phase shift, respectively). Mixing with the LO yields:

$$p_i(\lambda) \cdot \cos(2\pi f_2 \lambda) = \quad (18)$$

$$\left[\frac{1}{2}\cos\left(2\pi\left[(f_0 - k\tilde{t}_i)\lambda + \frac{k\lambda^2}{2} + \left(\frac{k\tilde{t}_i^2}{2} - f_1\tilde{t}_i\right) + \chi_i\right]\right) + \right.$$

$$\left.\frac{1}{2}\cos\left(2\pi\left[(f_1 - f_2 - k\tilde{t}_i)\lambda + \frac{k\lambda^2}{2} + \left(\frac{k\tilde{t}_i^2}{2} - f_1\tilde{t}_i\right) + \chi_i\right]\right)\right]$$

$$rect\left(\frac{\lambda - \tilde{t}_i}{T_r}\right).$$

Filtering to remove the undesired component in (18) and dropping the scale factor leads to:

$$p_i(\lambda) \cdot \cos(2\pi f_2 \lambda) \xrightarrow{filter} \quad (19)$$

$$\cos\left(2\pi\left[(f_0 - k\tilde{t}_i)\lambda + \frac{k\lambda^2}{2} + \left(\frac{k\tilde{t}_i^2}{2} - f_1\tilde{t}_i\right) + \chi_i\right]\right) rect\left(\frac{\lambda - \tilde{t}_i}{T_r}\right).$$

Observe that by choosing $X_i = (f_1 - f_0)\tilde{t}_i$, equation (19) is equal to the desired RF waveform 210 given in equation (5). Hence, the desired RF signal can be implemented by time delaying and phase shifting an IF waveform, then upconverting.

In another possible implementation, a waveform generator is used to create an undelayed RF (or IF) chirp. This signal is then passed through a device that implements the needed time delays. In particular, the waveform generator may contain a direct digital synthesizer (DDS). The DDS waveform can then be processed with a digital time-delay filter, i.e., a digital filter that approximates a time delay, then converted to an analog signal.

In another possibility, a waveform generator is used to create an undelayed RF (or IF) chirp that is frequency shifted and phased shifted at each channel. For example, if the waveform generator operates at RF, then the waveform on channel i is:

$$\cos\left(2\pi\left[(f_0 + F_i)\lambda + \frac{k\lambda^2}{2} + \varpi_i\right]\right) \cdot rect\left(\frac{\lambda}{T_r}\right) \quad (20)$$

where the desired frequency shift is $$F_i = -k\tilde{t}_i \quad (21)$$

and the desired phase shift is $$\varpi_i = \left(\frac{k\tilde{t}_i^2}{2} - f_0\tilde{t}_i\right). \quad (22)$$

Observe that together, (20), (21) and (22) approximate (5). Similar frequency and phase shifts can be used when the waveform is generated at IF and upconverted. Note that the frequency shift and phase shift may be implemented directly by each waveform generator, or incorporated after waveform generation, e.g., after mixing and sampling.

Next, consider the second delay 208. Ideally, the second delay is of size $-\beta_i$ and is applied after the received signal is mixed with the time-delayed chirp 210.

In the exemplary embodiment, this delay 208 is implemented digitally (after I/Q sampling). The digital time-delay filter should have an impulse response that closely approximates an ideal delay of $-\beta_i$. In practice, FIR filters can usually be designed to perform this function. Such FIR filters 208 may be implemented in either the time domain or frequency domain. In a frequency domain implementation, for example, one would first calculate the Fast Fourier Transform (FFT) of the received signal at the output to the I/Q sampling device 206. Then, a complex phase ramp is applied to the signal (via multiplication). The desired delay value is used to select the slope of the phase ramp. Finally, an inverse Fourier transform is computed.

As noted previously, when a FIR filter is used to implement the second delay 208, it can be mathematically combined with other application-dependent FIR filters 212 within the receiver. In particular, it can be combined with the narrowband digital compression filter 214 that is needed to resolve range.

Figure 3:
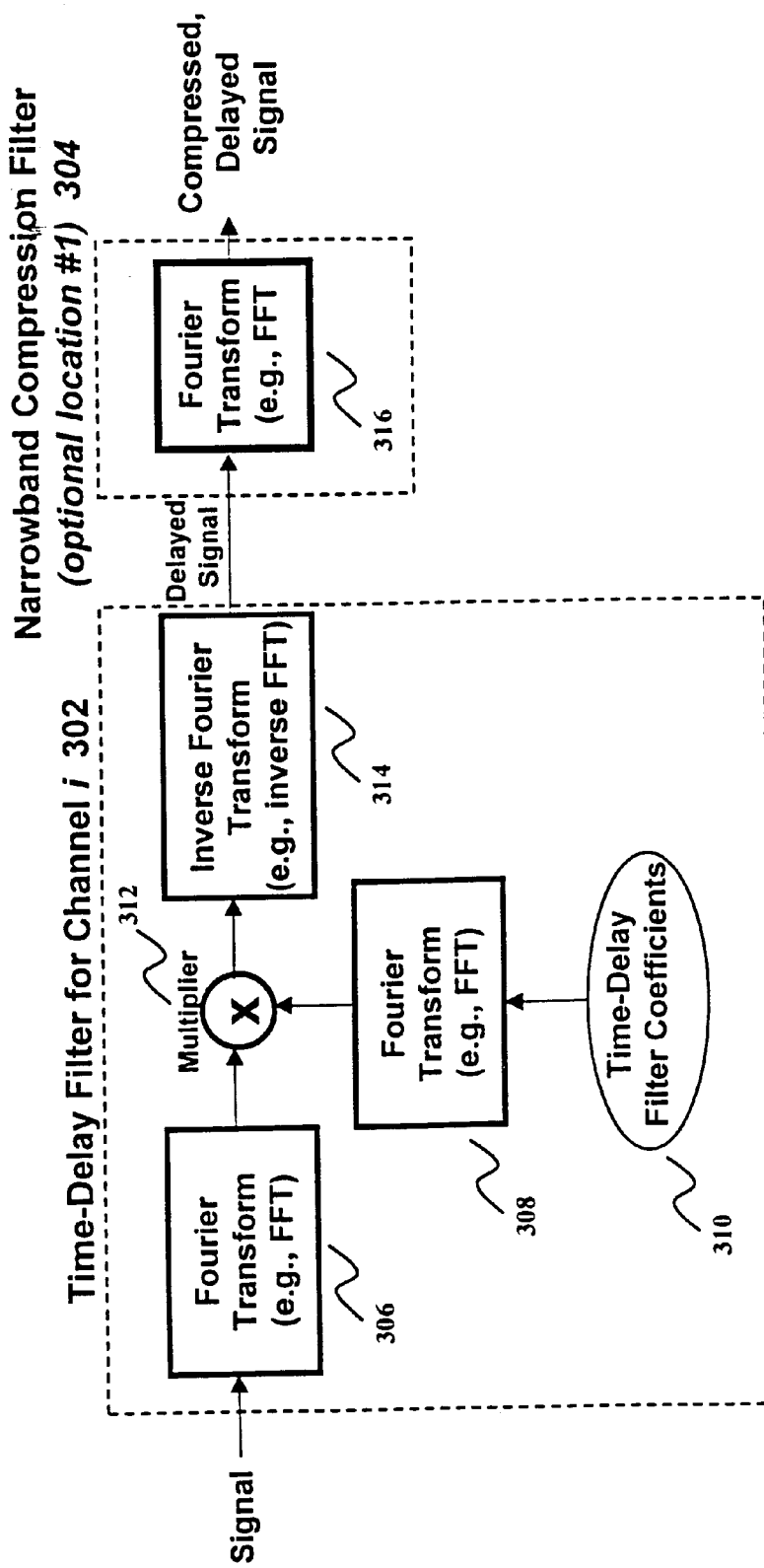
FIG. 3 is a block diagram showing a time-delay filter implementation cascaded with an implementation of the narrowband compression filter.

Referring now to FIG. 3, one possible implementation 300 of the time delay filter 208 and narrowband compression filter 214 is shown. The time delay filtering component, 302, is implemented in the frequency domain. It is assumed that the replica chirp 210 has been specifically chosen so that point targets will show-up as tones at the output of the analog filter 204. Hence, the narrowband digital compression filter implementation 304 can consist of an FFT 316. Note, then, that FFT 316 will essentially reverse the effect of inverse FFT 314. Hence, one can eliminate processing steps 314 and 316 in this implementation, leading to further computational reductions.

Drawings and a detailed description depicting an exemplary embodiment of the invention are given for purposes of illustration only. Those skilled in the art will readily recognize from the following discussion that alternative embodiments of the structures and methods illustrated herein may be employed without departing from the principles of the invention described herein.

Although the invention has been shown and described with respect to several preferred embodiments thereof, various changes, omissions and additions to the form and detail thereof, may be made therein, without departing from the spirit and scope of the invention.

What is claimed is:

1. A system for beamforming in a pulse-type sensor array, comprising:
   a source of pulsed wideband linear frequency modulated (LFM) signals;
   an array of sensors through which pulsed wideband signals are received, said array generating N channels of data;
   means for processing the N channels of data, wherein each channel is sampled at a rate below the Nyquist frequency associated with the signal bandwidth, and each channel is processed to completely align, from channel to channel, the frequency and phase of all pulsed wideband signals received from a desired direction, said processing being performed without the aid of analog time-delays; and
   means for further processing the N processed channels such that channels are combined coherently, allowing the full capability of said array to be steered equally to all signals in a desired direction, and signals are detected, localized, imaged and otherwise resolved to a degree that is commensurate with the wide bandwidth of the source pulses.

2. The system of claim 1 further comprising:
   means for producing LFM chirp replica signals;
   mixers supplied with said received wideband signals and said LFM chirp replica signals for producing resultant pulses that, after filtering, have frequency-time slopes less than that of the received pulses;
   sampling devices; and means for completely aligning from channel to channel the frequency and phase of all pulsed wideband signals received from a desired direction.

3. The system of claim 2 further comprising one or more digital compression filter supplied with sampled pulse-type signals and producing resultant non-dispersed pulses.

4. The system of claim 2, wherein the LFM chirp replica signals are time delayed, with delay values that vary from channel to channel.

5. The system of claim 4, wherein the delay value used for the LFM chirp replica signal at channel i is $\Gamma+\beta_i$, where $\Gamma$ is common to all channels, and $\beta_i$ represents the time needed for desired signals to travel from a common reference point to channel i.

6. The system of claim 4, wherein delays of the LFM replica chirp signals is achieved by either generating chirps with the desired delays; applying digital time-delay filters to undelayed digitized LFM chirp replicas, then converting to analog; generating undelayed chirps at an intermediate frequency, then processing to effect time-delays and phase shifts, then upconverting to the desired frequency; or generating undelayed chirps, then applying frequency shifts and phase shifts before or after mixing.

7. The system of claim 2, wherein the outputs of said sampling devices are time-delayed, with delay values that vary from channel to channel.

8. The system of claim 7, wherein the time-delay value used at channel i is $-\beta_i$.

9. The system of claim 7, wherein time-delaying of sampled signals is implemented through Finite Impulse Response (FIR) filtering in the time domain or frequency domain.

10. The system of claim 9, wherein time-delay filtering is mathematically combined with one or more other digital filters.

11. The system of claim 10, wherein time-delay FIR filtering is implemented in the frequency domain, and one other filter is a digital compression filter, the combination of which results in the cancellation of Fourier transformation operations.

12. The system of claim 2, wherein said means for completely aligning desired signals at channel i comprises time-delaying the chirp replica by $\Gamma+\beta_i$, then time delaying the sampled signal by $-\beta_i$.

13. The system of claim 1, wherein the coherent channel combining is performed by a digital beamformer.

14. A method of beamforming in a pulse-type sensor array, comprising:
   providing a source of pulsed wideband LFM signals;
   receiving pulsed wideband signals with an array of sensors, said array generating N channels of data;
   processing the N channels of data, wherein each channel is sampled at a rate below the Nyquist frequency associated with the signal bandwidth, and each channel is processed to completely align, from channel to channel, the frequency and phase of all pulsed wideband signals received from a desired direction, said processing being performed without the aid of analog time-delays; and
   further processing the N processed channels such that channels are combined coherently, allowing the full capability of said array to be steered in a desired signal direction, and signals are detected, localized, imaged and otherwise resolved to a degree that is commensurate with the wide bandwidth of the source pulses.

15. The method of claim 14, wherein the processing at each receiver further comprises:
   generating LFM chirp replica signals;
   generating resultant pulses which, after filtering, have a frequency-time slope less than that of the received pulses;
   sampling; and completely aligning from channel to channel the frequency and phase of all pulsed wideband signals received from a desired direction.

16. The method of claim 15 further comprising digital compression filtering and digital beamforming.

17. The method of claim 15, wherein the LFM chirp replica signals are time delayed, with delay values that vary from channel to channel.

18. The method of claim 17, wherein the delay value used for the LFM chirp replica signal at channel i is $\Gamma+\beta_i$, where $\Gamma$ is common to all channels, and $\beta_i$ represents the time needed for desired signals to travel from a common reference point to channel i.

19. The method of claim 15, wherein the output of said sampling device is time-delayed, with a delay value that varies from channel to channel.

20. The method of claim 19, wherein the time-delay value used at channel i is $-\beta_i$.

* * * * *